United States Patent [19]

Kasu et al.

[11] 4,129,892

[45] Dec. 12, 1978

[54] BACK-UP PRESSURE MECHANISM WITH TENSIONED ELONGATED MEMBER

[75] Inventors: Abdul L. Kasu, Livonia; Jerry I. Tustaniwskyj, Warren, both of Mich.

[73] Assignee: Burroughs Corporation, Detroit, Mich.

[21] Appl. No.: 861,978

[22] Filed: Dec. 19, 1977

[51] Int. Cl.² .................. G11B 15/60; G11B 5/10
[52] U.S. Cl. .................................. 360/130; 360/128
[58] Field of Search ........................... 360/130, 128

[56] References Cited

U.S. PATENT DOCUMENTS

| 3,506,271 | 4/1970 | Greifenhagen et al. | 360/130 |
| 3,851,115 | 11/1974 | Zacaroli | 360/128 |
| 3,984,049 | 10/1976 | Shawen | 360/130 |
| 4,031,558 | 6/1977 | Kasaka | 360/130 |

*Primary Examiner*—Robert S. Tupper
*Attorney, Agent, or Firm*—Carl Fissell, Jr.; Kevin R. Peterson

[57] ABSTRACT

Tensioning device for use with electromagnetic read/write transducing apparatus wherein a flat elongated band or strip of non-magnetic material is arranged adjacent to a plurality of read/record heads effective to support an item adapted to move between the heads and the tensioning strip and wherein the strip is lever actuated from a relaxed, released condition relative to the heads enabling easy removal and replacement due to wear or breakage into a taut condition and including means to prevent stray magnetic flux from one transducing device from interfering with the magnetic flux of another local transducing device effectively insuring a high level signal output.

6 Claims, 5 Drawing Figures

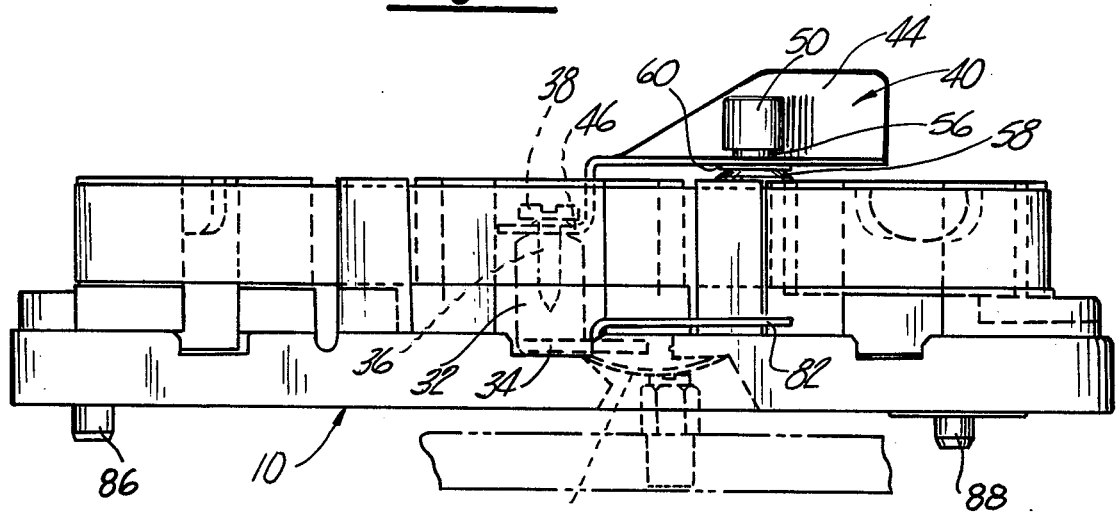
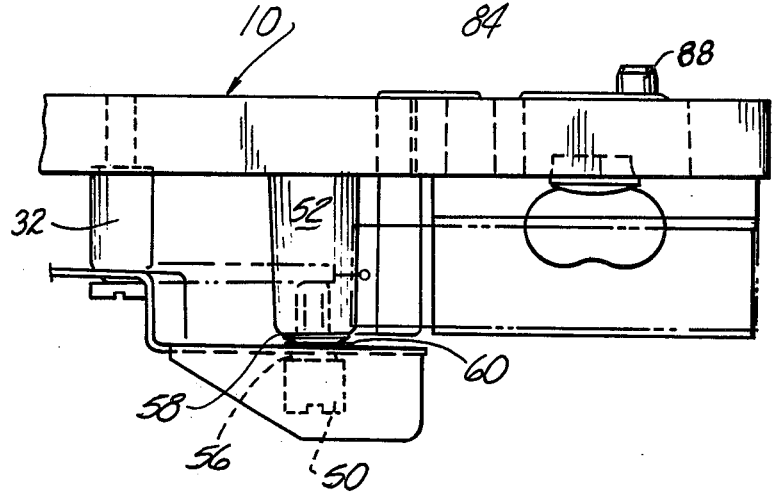
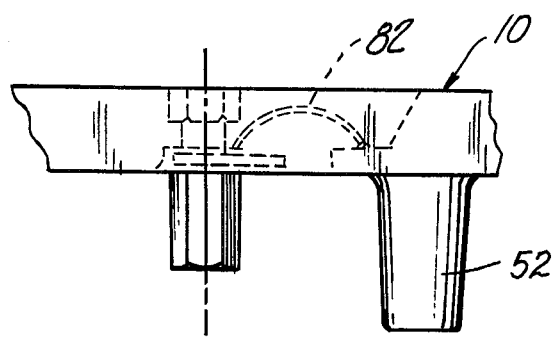

BACK-UP PRESSURE MECHANISM WITH TENSIONED ELONGATED MEMBER

BACKGROUND OF THE INVENTION

1. Field of the Invention

The present invention relates generally to tensioning devices and more particularly the invention has to do with non-magnetic tensioning devices for use with multiple electromagnetic read/record heads particularly that type of read/record head which is employed with high speed rotating drum-type read/write equipment.

2. Description of the Prior Art

Prior art devices generally include individual mechanical spring type loading apparatus for producing pressure between a document or item and a transducing head so that the item being read by the transducer will be obliged to move therepast under pressure supplied by the tensioning device.

Such devices suffer from problems due to the inability of the apparatus to accommodate to change or rearrangement or replacement. That is to say, when wear begins to be severe and the tension has to be changed or altered it is exceedingly difficult to maintain proper tension and pressure on the head or heads while renewing the back-up device. The devices in use at the present time are unwieldy and require precision adjustment and readjustment each time the tensioning element is changed making maintenance costly and inefficient.

SUMMARY OF THE INVENTION

It is an important object therefore of the present invention to provide tensioning means which can accommodate itself very readily to alteration, change, rearrangement and replacement while maintaining accurate alignment with respect to the transducer.

Still another important object of the invention is to provide tensioning means which is capable of maintaining a precise, fixed head to document pressure even though the device may be altered for cleaning or replaced due to wear.

Another object of the invention is to provide a completely demountable unitary assembly which incorporates unitary demountable tensioning apparatus so that once the pressure relationships are established with respect to the transducer removal of the tensioning device will not destroy such fixed relationships.

These and other objects and advantages of the present invention are achieved by the subject matter of the present invention which includes a tensioning device for use with electromagnetic read/record transducing apparatus wherein a flat band or strip of non-magnetic material such as Dynavar tape is arranged in an arcuate pattern adjacent to a plurality of read/record heads effective to compress an item adapted to move between the heads and the tensioning strip and wherein the strip is lever actuated from a relaxed or released condition into a compression condition relative to the heads and wherein the apparatus includes demountable ferrite members which are simply and easily oriented so as to prevent any stray flux from interfering with the adjacent head operation.

Other objects, features and advantages of the present invention will be readily apparent in the following detailed description when considered in light of the accompanying drawings, which illustrate by way of example and not limitation, the principals of the invention and a preferred mode for applying these principals.

BRIEF DESCRIPTION OF THE DRAWINGS

FIG. 3 is a view of the invention taken in the direction of the arrow 3 of FIG. 2;

FIG. 4 is an enlarged detail view of the handle portion of the apparatus of FIG. 1; and FIG. 5 is an enlarged detail view of the grounding bus arrangement of the present invention.

DETAILED DESCRIPTION OF THE PREFERRED EMBODIMENT

Figure 2:
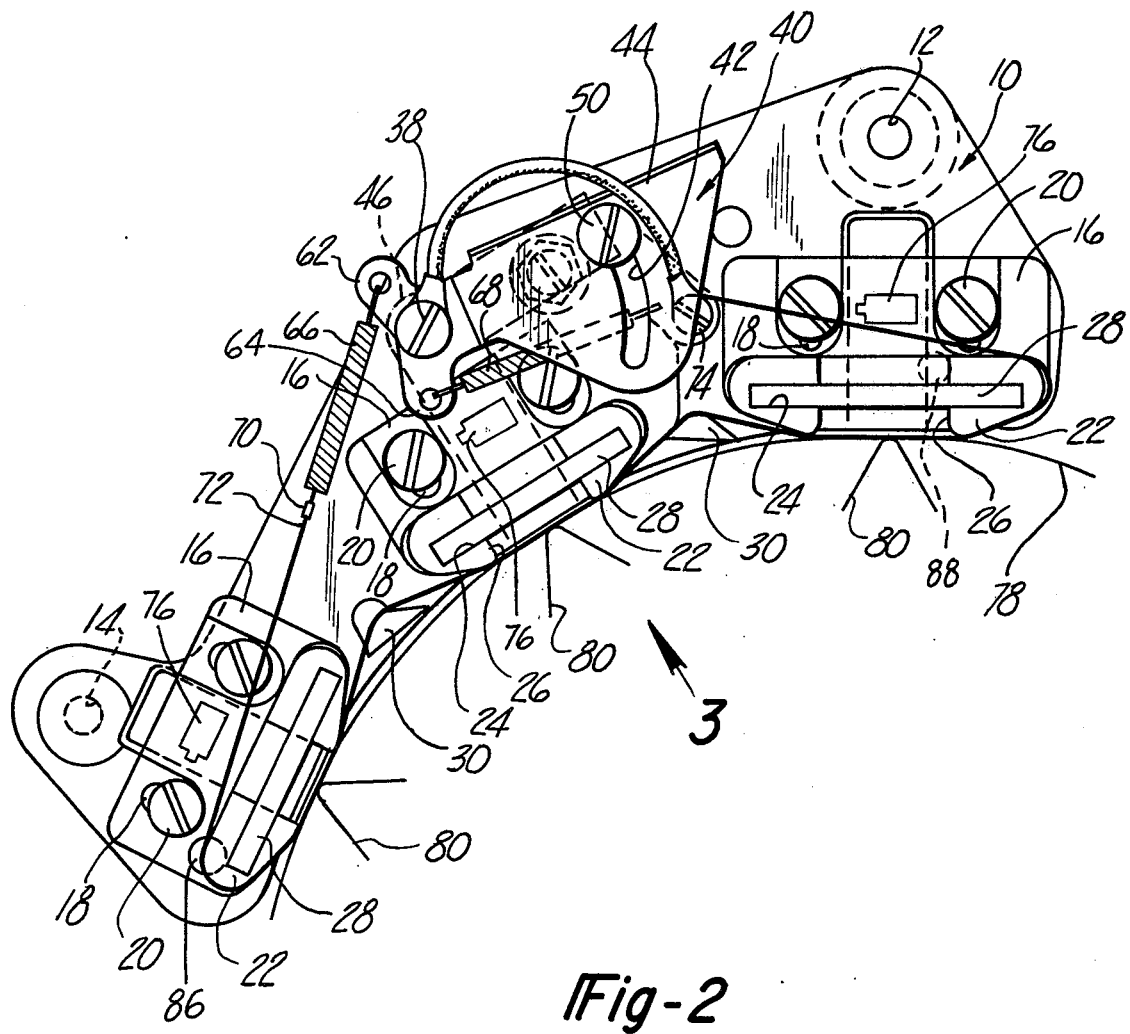
FIG. 2 is a full scale top plan view of the invention.

As seen most clearly in FIG. 2 of the drawings, the apparatus embodying the present invention comprises an irregularly shaped support member or base 10 of rigid, non-conductive, non-magnetic material such as plastic or thermosetting resin or non-magnetic metals. Member 10 is additionally provided with oppositely disposed mounting apertures 12 and 14 for securing the demountable, unitary assembly incorporating the present invention within a larger apparatus or structure such, for example, as a reader/sorter or similar device capable of reading and writing on various items of commerce, e.g., punched cards, checks or other type items of exchange.

Figure 1:
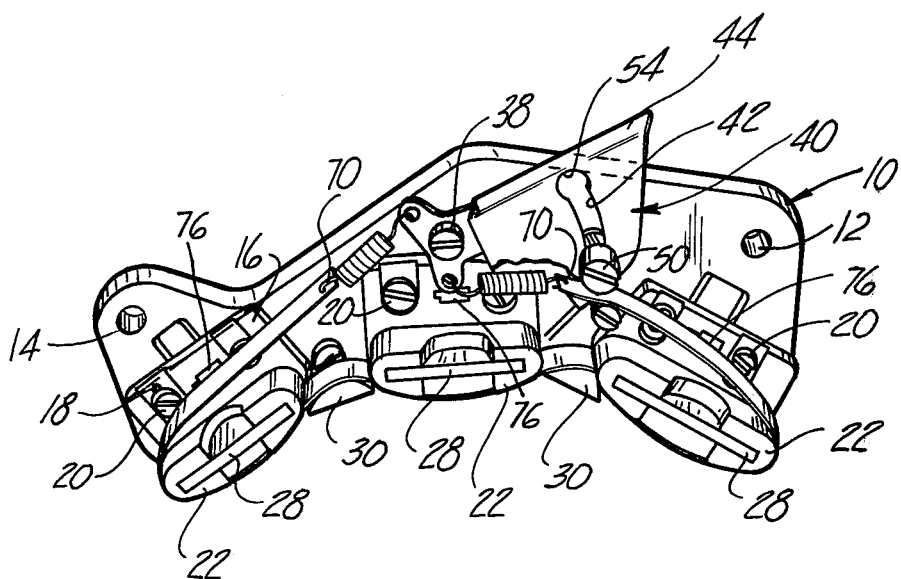
FIG. 1 is a perspective view of the apparatus embodying the present invention.

Arranged arcuately about the base 10 are three guided, slidable blocks 16, each one of which is provided with a pair of sloted apertures 18 for slidably mounting the blocks 16 to the base 10 by means of short bolts 20 which pass through the slide blocks for attachment into base 10. The forward portion of each block 16 is shaped in the form of an upstanding pedestal 22, FIG. 1, having an elongated transverse slot 24 extending from side to side therewithin with the front portion 26 of the slot, as viewed in FIGS. 1 and 2, opening outwardly as shown to provide an access receptacle for receiving a slidable demountable, flat, rigid, ferrite keeper member 28 for purposes to be explained later on herein. Keepers 28 can be molded in place, press fitted or adhesively secured in place.

Disposed between the two outboard slide blocks 16 and the central slide block 16 are individual upstanding triangularly shaped tape routing and tensioning members 30—30 integral with or rigidly fixed on base 10.

Located behind the middle slide block 16 is a vertical post 32, FIG. 3, of conductive material, the lower end portion of which is connected to a grounding lug 34, FIG. 3, while the upper vertically extending end portion of post 32 terminates in a threaded aperture 36 into which a bolt 38 is received to loosely, threadedly mount thereto the pivot end of a locking lever 40. Lever 40 comprises a triangularly shaped, flat, rigid member having a transverse arcuate opening or slot 42 in the larger portion thereof, as shown. A bent up tang 44 integral with lever 40 acts as a handle. Extending leftwardly from the main body portion of member 40 is a two pronged pivot member 46 through which bolt 38 depends to mount lever 40 to post 32 for arcuate movement about post 32. A bolt 50 extending through arcuate aperture 42 into a vertically extending pedestal 52, FIG. 4, permits lever 40 to move arcuately a slight distance from the position shown in FIG. 1 to the position shown in FIG. 2 of the drawings. The inboard end of aperture 42 is enlarged as at 54, FIG. 1, so as to captivate the enlarged end 56 of bolt 50, FIGS. 3 and 4, effective to retain the lever 40 in the locked position, FIG. 2. A spring 58 capped by a washer 60 enables the lever 40 to be depressed downwardly about the loose pivot 38. This enables bolt 50 to move out of the enlarged opening 54 from a position in which the lever is locked, FIG. 2, into the regular arcuate portion of opening 42 to swing to the position of FIG. 1 in which the lever is unlocked.

Attached to each of the tangs 62 and 64 is a spring 66 and 68, respectively. The opposite end of each spring 66 and 68 is received in a metal grommet 70 located in opposite end portions of a thin, elongated, i.e. longer than its width, flat, non-magnetic slightly resilient flexible tensioning member 72. Member 72 extends from spring 68 over vertical post 74 around righthand slide block 16, FIg. 2, across the front of this block and the opening housing the ferrite keeper 28, behind member 30 on the right side of the central slide block 16, across the face of central slide block 16, behind member 30 on the left side of central block 16, around the front face of lefthand slide block member 16, around slide block 16 and back rightwardly for attachment to spring 66.

The three slide blocks 16 carrying the ferrite keepers 28 are made to be incrementally movable by means of a screwdriver adjustment slot 76 which is molded, milled or otherwise formed in each block such that when the bolts 20 securing the blocks 16 to base 10 are loosened, slight movement of the blocks in slots 18 with a screwdriver will cause each block to move either toward or away from the rotatable item moving drum 78 and the three read/write heads 80. In this manner, suitable accurate positioning can be provided for the proper pressure between heads and tape 72. Thus, when lever 40 is moved from the unlocked position to the locked position both ends of the tape are drawn against the tension of the springs about the tensioning blocks 30-30 placing the tape under suitable tension effective to place a slight pressure against each of the read/write heads 80 by the tape tensioning member 72. The sliding ferrite keeper blocks 16 are adjusted toward the heads with lever 40 in the locked position, i.e. with the tape 72 under tension.

Because the tensioning device is metallic even though non-magnetic and because movement of the documents against the tape can induce an electrical charge on tape, a grounding path is provided which couples both ends of the tape to a grounding bus 82, FIGS. 2, 3 and 5, via the two pivot members 38 and 50. The grounding bus 82 is then connected to a conducting spring 84 which in turn connects to the logic ground of the machine logic for the sorter/reader with which the present apparatus is used. Oppositely disposed guide pins 86 and 88, as seen in FIGS. 2, 3 and 4, permit the tensioning assembly of the present invention to be demountably removable for maintenance and/or repair and replacement of parts due to wear, etc., while enabling accurate relocation of the assembly in the base reader/sorter apparatus without adjustment or experimentation.

What is claimed is:

1. A demountable back-up pressure mechanism for a high speed read/write device having two or more acruately displaced electromagnetic read/with transducer members comprising:
    an elongated, flexible, non-magnetic member including means mounting said elongated member adjacent said transducer members effective thereby to provide constant uniform back-up pressure for the active portion of said transducers,
    means operably associated with said elongated non-magnetic member for selectively placing said member under tension effective to rigidify and flatten said member adjacent to said transducer members, and
    means for locking said elongated member in said tensioned condition and for releasing said elongated member from said tensioned condition for repair or replacement.

2. The invention in accordance with claim 1 wherein said means for placing said non-magnetic member under tension further comprises:
    arcuately arranged pressure members disposed opposite to a respective transducer member and including means for captivating stray electromagnetic flux or other stray fields emanating from said transducers, and
    guide means intermediate said pressure members wherein said elongated member runs across said pressure members and said guide means.

3. The invention in accordance with claim 1 wherein said elongated member is a strip of resilient non-magnetic metal material with its opposite ends connected by pivot means movable to one position placing said elongated member under tension and to another position releasing said elongated member from tension.

4. The invention in accordance with claim 1 wherein said demountable back-up pressure mechanism includes oppositely disposed locating pins for reception in the assembly with which the mechanism is operably asssociated permitting said mechanism to be demountable and accurately relocated without additional adjustment thereof.

5. The invention in accordance with claim 2 including means permitting said flux captivating means to be slidably demountably removable relative to each electromagnetic transducer member for replacement or renewal.

6. The invention in accordance with claim 2 wherein said magnetic flux captivating means comprises a shaped ferrite element and wherein said movable pressure members include adjustment means providing sliding movement toward and away from the respective transducer member.

* * * * *